United States Patent
Kooiman

[11] Patent Number: 6,154,963
[45] Date of Patent: Dec. 5, 2000

[54] SAW GUIDE FOR ANNULARLY CORRUGATED CABLES

[75] Inventor: John A. Kooiman, Lockport, Ill.

[73] Assignee: Andrew Corporation, Orland Park, Ill.

[21] Appl. No.: 09/289,840

[22] Filed: Apr. 12, 1999

[51] Int. Cl.[7] .................................................. B26B 29/00
[52] U.S. Cl. ................................ 30/90.2; 30/92; 30/289
[58] Field of Search ............................... 30/1, 90.2, 90.3, 30/92, 96, 286, 289

[56] References Cited

U.S. PATENT DOCUMENTS

| | | | |
|---|---|---|---|
| 2,246,350 | 6/1941 | Dottl | 30/90.2 |
| 3,291,895 | 12/1966 | Van Dyke | 174/88 |
| 3,965,571 | 6/1976 | Lyman | 30/90.2 |
| 4,046,451 | 9/1977 | Juds et al. | 339/177 |
| 4,063,355 | 12/1977 | Netzel | 30/96 |
| 4,114,266 | 9/1978 | Erpenbeck | 30/96 |
| 5,137,470 | 8/1992 | Doles | 439/578 |
| 5,154,636 | 10/1992 | Vaccaro et al. | 439/583 |
| 5,167,533 | 12/1992 | Rauwolf | 439/874 |
| 5,179,781 | 1/1993 | Weaver | 30/92 |

FOREIGN PATENT DOCUMENTS 0619263  8/1978  U.S.S.R. .................................. 30/90.2

*Primary Examiner*—Hwei-Siu Payer
*Attorney, Agent, or Firm*—Stephen G. Rudisill, Esq.; Jenkens & Gilchrist

[57] ABSTRACT

A saw guide for a cable having an annularly corrugated outer conductor is provided. The saw guide includes an inner partially cylindrical surface and a gripping rib extending radially inward therefrom. The saw guide further includes a pair of stabilizing members disposed on each side of the gripping rib. Each stabilizing member forms a cutting face that is configured to position a cutting instrument generally orthogonal to the longitudinal axis of the cable.

21 Claims, 4 Drawing Sheets ns described prior art saw guides will work because there are no separate connector components on which to fasten a saw guide to assist in properly registering the saw guide with the cable.

SAW GUIDE FOR ANNULARLY CORRUGATED CABLES

FIELD OF THE INVENTION

This invention relates generally to coaxial cables, and, more particularly, to saw guides for coaxial cables which have annularly corrugated outer conductors.

BACKGROUND OF THE INVENTION

Coaxial cable is characterized by having an inner conductor, an outer conductor, and an insulator therebetween. At the end of the coaxial cable, a connector is attached to allow for mechanical and electrical coupling of the coaxial cable.

Connectors for coaxial cables have been used throughout the coaxial cable industry for a number of years. For example, U.S. Pat. No. 5,167,533 (Rauwolf) describes a connector for coaxial cables having hollow inner conductors. U.S. Pat. No. 5,154,636 (Vaccaro et al.) describes a connector for coaxial cables having helically corrugated outer conductors. U.S. Pat. No. 5,137,470 (Doles) describes a connector for coaxial cables having hollow and helically corrugated inner conductors. U.S. Pat. No. 4,046,451 (Juds et al.) describes a connector for coaxial cables having annularly corrugated outer conductors and plain cylindrical inner conductors. U.S. Pat. No. 3,291,895 (Van Dyke) describes a connector for cables having helically corrugated outer conductors and hollow, helically corrugated inner conductors.

Traditionally, annularly corrugated coaxial cables are prepared for fitting a connector assembly thereto. In order to prepare the cable for the connector, it is necessary to cut through the cable, often with a hacksaw. It is important that when an installer cuts through the cable that the cut is made very straight and in precisely the correct location in order to maximize the return loss performance of the completed cable/connector assembly combination.

However, when installing connectors to cables it is difficult to achieve the proper registration of the saw guide with the rounded apex of an annularly corrugated outer conductor. It is also difficult to get the saw guide to hold itself in place so that the installer has both hands free to hold and cut the cable.

Various types of tools and saw guides have been used in the past to assist in achieving a straight, precise cut. Prior art saw guides include simple washers that register against one of the connector components. However, washers will not hold themselves in place on the cable. Clamps have also been used as saw guides. The clamps secure one of the connector components in place on the cable so that the component itself becomes the saw guide. However, this often results in damage to the connector component.

In addition, there are prior art molded saw guides that press fit onto, or are threadedly connected to, one of the connector components to secure the saw guide in place on the cable. One such prior art saw guide is illustrated in FIG. 1. There, the saw guide 1 is threaded to the front end of the rear body member 3 of a connector assembly. The saw guide 1 holds a spring ring 2 in place on the rear body member 3. The spring ring 2 rests in one of the valleys of a corrugated cable (not shown). The cable is then cut adjacent to the flat face of the saw guide 1. Next, the front body member (not shown) is fastened to the rear body member 3.

However, with the advent of the One Piece Connector from Andrew Corporation (U.S. patent application Ser. No. 09/271,390, filed Mar. 19, 1999), none of the above described prior art saw guides will work because there are no separate connector components on which to fasten a saw guide to assist in properly registering the saw guide with the cable.

Therefore, there is a need for a new type of saw guide that is capable of registering itself with respect to the cable and holding itself in place without the assistance of any connector components. There is also a need for a saw guide that can be manufactured at low cost so the saw guide can be essentially a one time use disposable tool.

The present invention is directed to overcoming, or at least reducing, the above mentioned difficulties.

SUMMARY OF THE INVENTION

In accordance with the present invention, a saw guide for an annularly corrugated coaxial cable is provided. The saw guide includes an inner partially cylindrical surface and a gripping rib extending radially inward therefrom. The saw guide further includes a pair of stabilizing members disposed on each side of the gripping rib. Each stabilizing member forms a cutting face that is configured to position a cutting instrument generally orthogonal to the longitudinal axis of the cable.

DESCRIPTION OF ILLUSTRATIVE EMBODIMENTS

Although the invention will be described in connection with certain preferred embodiments, it will be understood that it is not intended to limit the invention to those particular embodiments. On the contrary, it is intended to cover all alternatives, modifications, and equivalents that may be included within the spirit and scope of the invention as defined by the appended claims.

Figure 4:
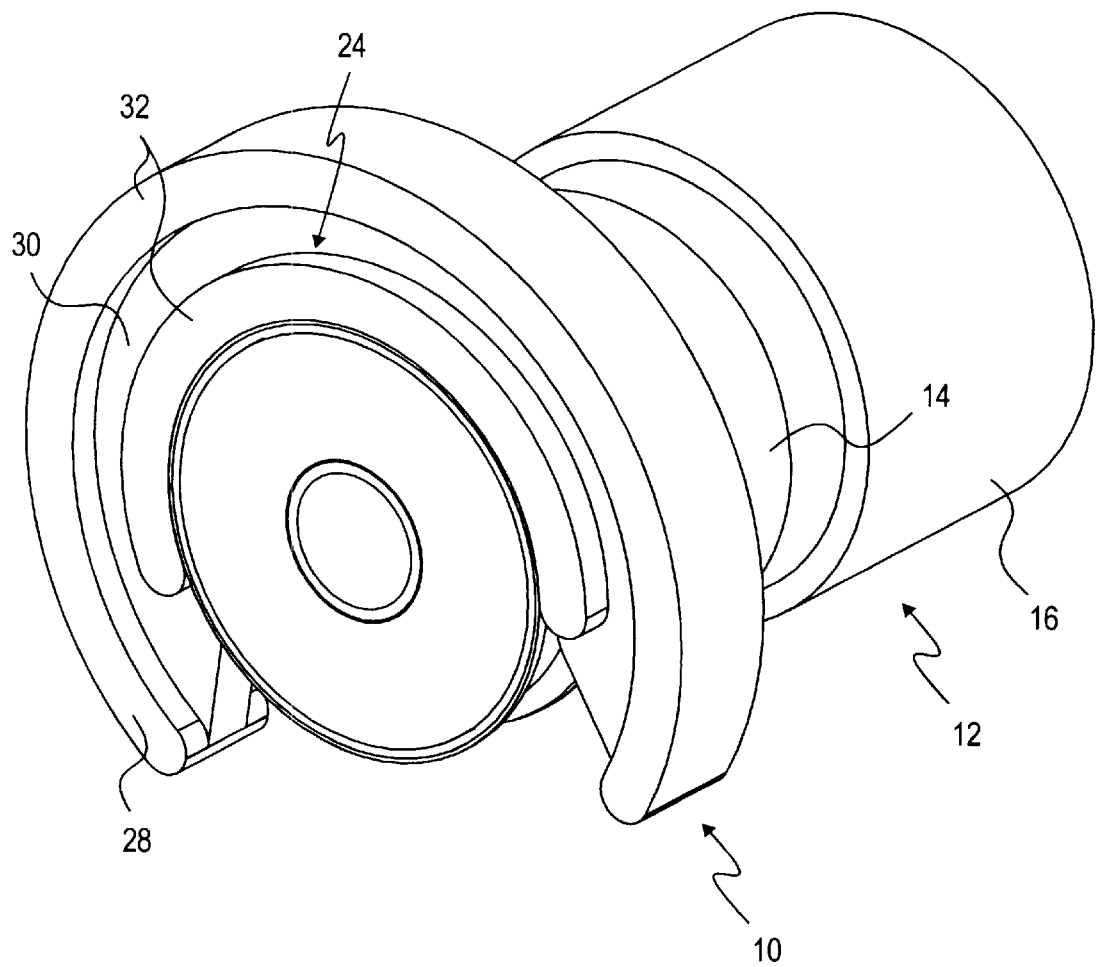
FIG. 4 is a perspective view of the saw guide of FIG. 2 installed over a coaxial cable, having an annularly corrugated outer conductor, cut with the claimed saw guide.

Turning now to the drawings, FIG. 4 shows a saw guide 10 for a coaxial cable 12 having an annularly corrugated outer conductor 14. As is well known to those familiar with this art, an "annularly" corrugated conductor is distinguished from a "helically" corrugated conductor in that the annular corrugations form a series of spaced parallel crests which are discontinuous along the length of the cable and, similarly, a series of spaced parallel valleys which are also discontinuous along the length of the cable. That is, each crest and valley extends around the circumference of the conductor only once, until it meets itself, and does not continue in the longitudinal direction. Consequently, any transverse cross-section taken through the conductor perpendicular to its axis is radially symmetrical, which is not true of helically corrugated outer conductors.

To prepare the cable 12 for attachment of a connector assembly, the end of the cable 12 is cut along a plane extending through the apex of one of the crests of the corrugated outer conductor 14 and perpendicular to the axis of the cable 12. The outer surface of the outer conductor 14 is normally covered with a plastic jacket 16 which is trimmed away to expose the outer conductor 14 along a length sufficient to accommodate a connector assembly.

Figure 1:
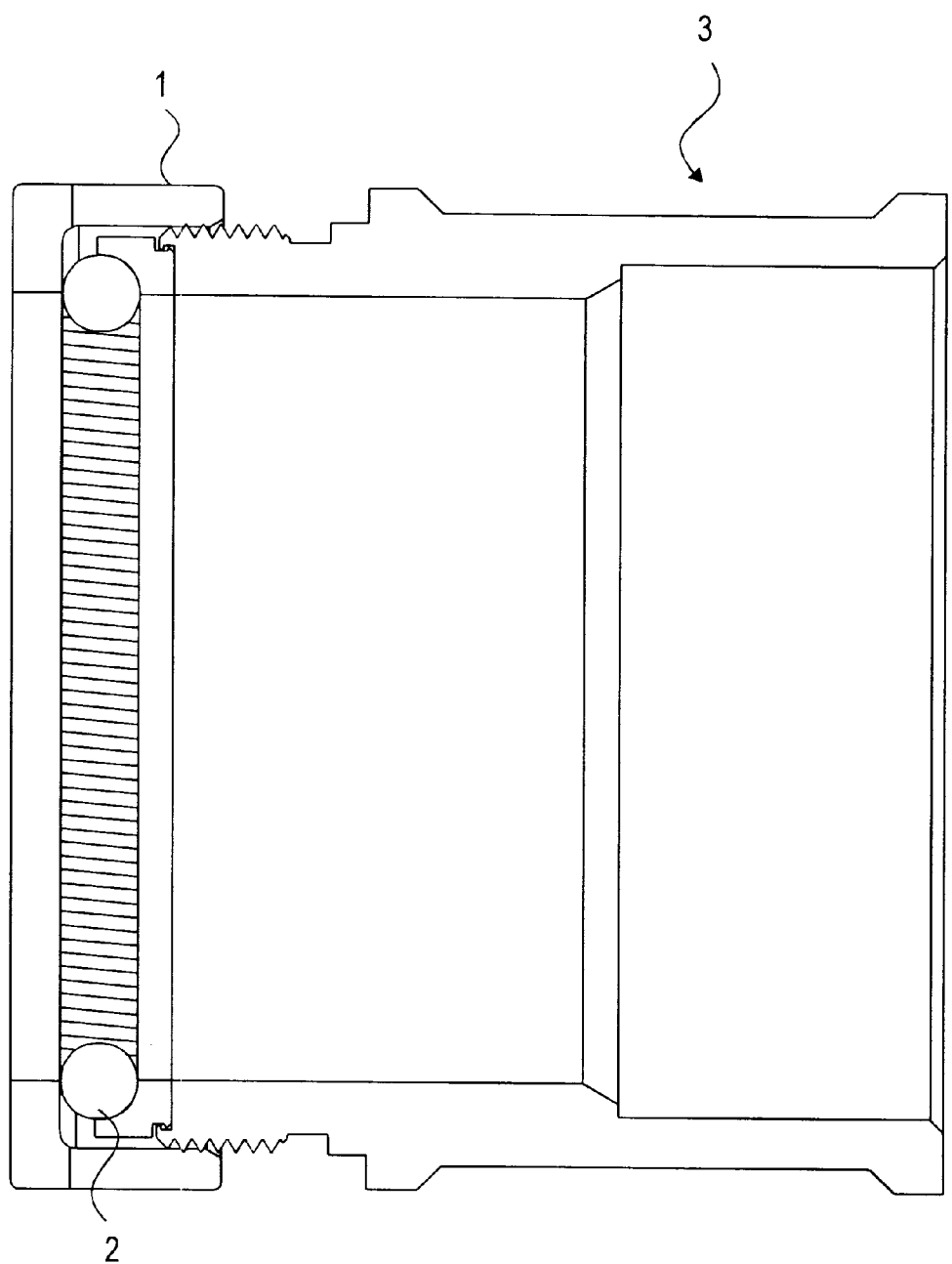
FIG. 1 is a longitudinal section through the center of a prior art saw guide and connector.
Figure 2:
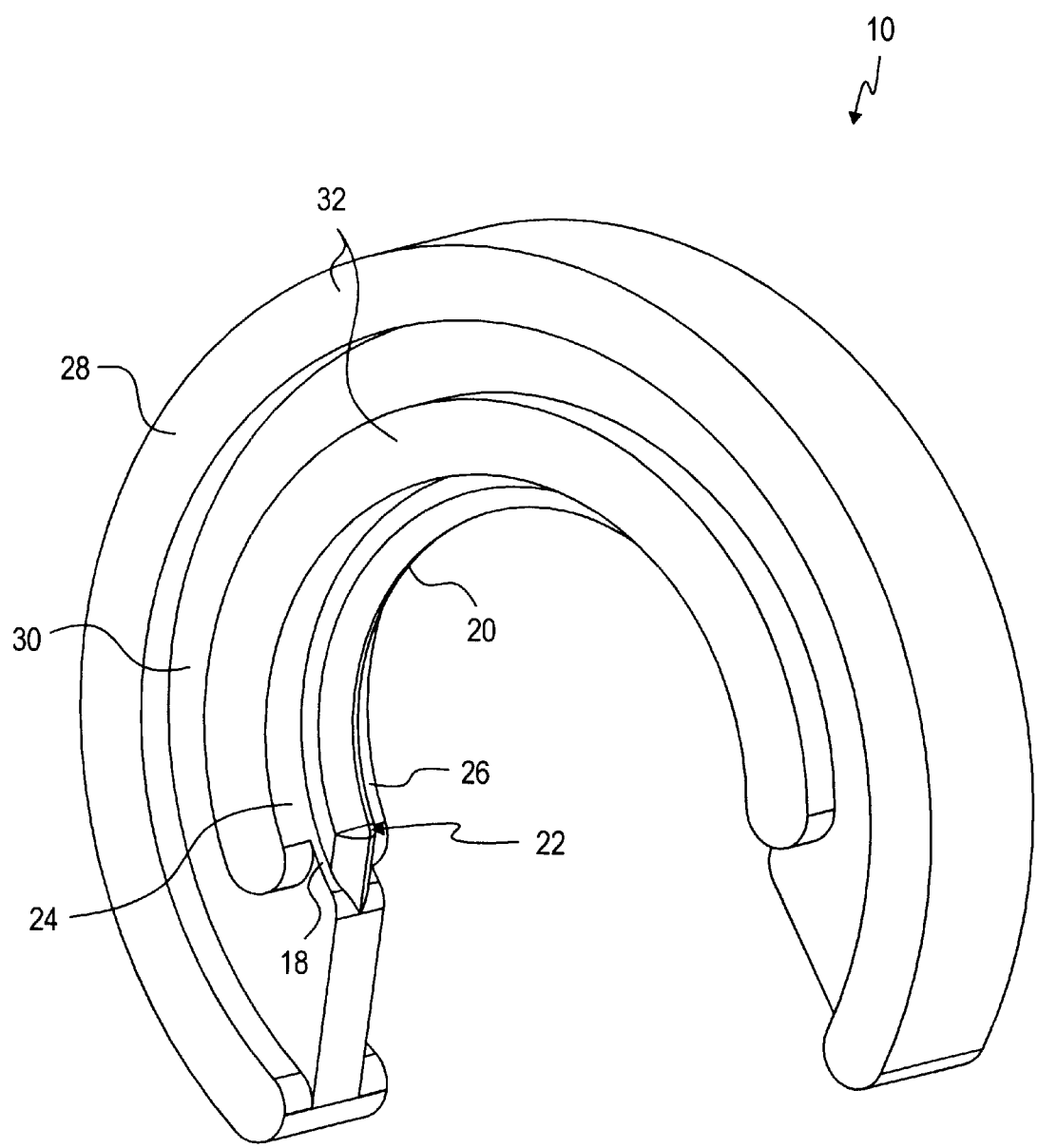
FIG. 2 is a perspective view of a saw guide embodying the present invention.

As best illustrated in FIG. 2, the saw guide 10 is generally "C" shaped. In one embodiment, the saw guide 10 is made of plastic, most preferably from filled nylon. However, other materials may be used so long as the saw guide is resilient. The saw guide 10 is resilient enough to fit over and snap into position around the outer conductor 14 of the cable 12, as illustrated in FIG. 4. The saw guide 10 includes an inner partially cylindrical surface 18. A gripping rib 20 extends radially inward from the inner generally cylindrical surface 18, as illustrated in FIG. 2. The gripping rib 20 is designed to fit in a valley of the corrugated outer conductor 14. The gripping rib 20 inhibits axial movement of the saw guide 10 relative to the cable.

Figure 3:
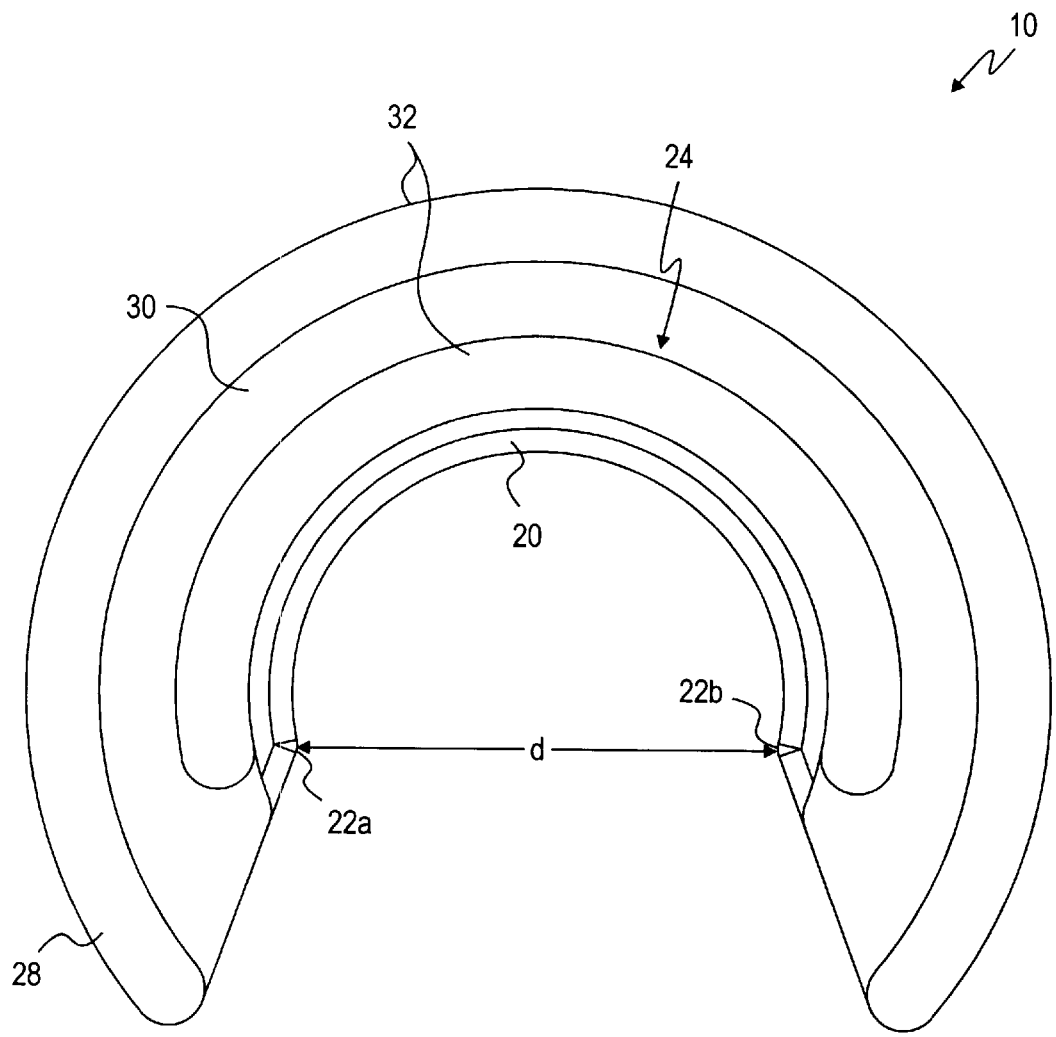
FIG. 3 is a front view of the saw guide of FIG. 2.

In one embodiment, the gripping rib 20 extends slightly more than 180° around the outer conductor 14 once the saw guide is installed on the cable 12. Annularly corrugated cables have two diameters, an inner diameter measured between opposing valleys and an outer diameter measured between opposing crests. As illustrated in FIG. 3, the linear distance d between the ends 22a and 22b of the gripping rib 20 is less than the inner diameter of the cable 12. The resilient material of the saw guide 10 allows the distance d to elasticly expand and contract as the saw guide 10 is snapped over the inner diameter of the cable 12. The saw guide 10 is configured such that once the saw guide 10 is snapped over the cable 12, the gripping rib 20 fits into a valley of the outer conductor 14. Accordingly, the saw guide 10 is locked onto the outer conductor 14. This allows the installer to use both hands to hold and cut the cable 12.

The saw guide 10 also includes a pair of stabilizing members 24 and 26, one disposed on each side of the gripping rib 20. The width of each stabilizing member 24, 26 is matched to the corrugation pitch length such that each stabilizing member 24, 26 terminates on the crest of a corrugation on the outer conductor 14. The inner diameter of each stabilizing member 24, 26 (measured between opposing sides of each stabilizing member) is matched to the outer diameter (measured between opposing crests) of the cable 12. The stabilizing members 24 and 26 are configured to mate with respective portions of two adjacent crests of the outer conductor 14 on respective sides of the valley where the gripping rib 20 is disposed. The stabilizing members 24 and 26 stabilize and hold the saw guide 10 securely at the correct 90° orientation with respect to the longitudinal axis of the cable 12. Thus, the saw guide 10 enables the installer to make a cut precisely on the crest of a corrugation and perpendicular to the axis of the cable 12. The outer diameter of the saw guide 10 is chosen to adequately guide a cutting instrument. In one embodiment, the cable 12 is cut with a typical hacksaw blade. Accordingly, the outer diameter of the saw guide 10 is at least equal to the height of the hacksaw blade.

The saw guide 10 is generally formed by an injection molding process. This process is relatively inexpensive and efficient.

In one embodiment, an outer guide ring 28 is radially displaced from the stabilizing member 24 by a groove 30. The groove 30 is designed to improve the manufacturabilty of the saw guide 10. Specifically, the groove 30 allows the injection molding press to evenly cool the molten plastic used to make the saw guide 10. Portions of plastic parts that are further away from the press cool at different rates than portions closer to the press. This causes distortion of the resulting part. The groove 30 divides the saw guide 10 into portions with generally uniform radial widths. Thus, the groove 30 acts as a heat sink that helps to assure the dimensional accuracy of the resulting saw guide 10 by reducing distortion. The groove 30 also helps to reduce cooling and cycle times during the molding process.

The saw guide 10 is symmetrical and reversible so that each saw guide 10 provides two cutting faces 32, one on each side of the saw guide 10. Thus, one saw guide 10 can be used to cut two cables or to cut the same cable twice. The symmetrical nature of the saw guide 10 also makes the molds easier and less expensive to produce.

The above detailed description of the various embodiments of the present invention is for illustrative purposes only and it is not intended to limit the present invention in any manner. Other aspects, features, advantages and modifications of the present invention will become apparent to those skilled in the art upon studying this invention. All such aspects, features, advantages and modifications of the present invention are intended to be within the scope of the present invention as defined by the claims.

What is claimed is:

1. A saw guide for a cable having an annularly corrugated outer conductor, said saw guide comprising:
    a generally C-shaped member having an inner partially cylindrical surface including a gripping rib extending radially inward therefrom, said gripping rib being configured to fit in a valley in said corrugated outer conductor,
    a pair of stabilizing members, one disposed on each side of said gripping rib, said stabilizing members being configured to mate with respective portions of two adjacent crests of said outer conductor on respective sides of said valley, each stabilizing member forming a cutting face that is configured to position a cutting instrument generally orthogonal to the longitudinal axis of said cable.

2. The saw guide of claim 1, wherein once said saw guide is installed on said cable, said gripping rib extends slightly more than 180° around said outer conductor.

3. The saw guide of claim 1, wherein said gripping rib includes two opposing ends defining a linear distance therebetween, said distance being less than the inner diameter of said cable.

4. The saw guide of claim 1, further including an outer guide ring that is radially displaced from each said stabilizing member by a groove.

5. The saw guide of claim 1, wherein said saw guide is symmetrical and reversible.

6. A saw guide for a cable having an annularly corrugated outer conductor, and saw guide comprising:
    an inner partially cylindrical surface including a gripping rib extending radially inward therefrom;
    a pair of stabilizing members one disposed on each side of said gripping rib, each stabilizing member forming a cutting face that is configured to position a cutting instrument generally orthogonal to the longitudinal axis of said cable.

7. The saw guide of claim 6, wherein said gripping rib is configured to fit in a valley in said corrugated outer conductor of said cable.

8. The saw guide of claim 7, wherein said stabilizing members are configured to mate with respective portions of two adjacent crests of said outer conductor on respective sides of said valley.

9. The saw guide of claim 6, wherein once said saw guide is installed on said cable, said gripping rib extends slightly more than 180° around said outer conductor.

10. The saw guide of claim 6, wherein said gripping rib includes two opposing ends defining a linear distance therebetween, said distance being less than inner diameter of said cable.

11. The saw guide of claim 6, further including an outer guide ring that is radially displaced from each said stabilizing member by a groove.

12. The saw guide of claim 6, wherein said saw guide is symmetrical and reversible.

13. The saw guide of claim 6, wherein said saw guide is made of plastic.

14. The saw guide of claim 6, wherein said saw guide is resilient enough to allow said saw guide to fit over and snap into position around said outer conductor of said cable.

15. A method of forming a saw guide for cutting a cable having an annularly corrugated outer conductor, said method comprising the steps of:

forming a generally C-shaped saw guide having an inner partially cylindrical surface;

forming a gripping rib that extends radially inward from said inner partially cylindrical surface;

forming a pair of stabilizing members, one on each side of said gripping rib; and forming a cutting face that is configured to position a cutting instrument generally orthogonal to the longitudinal axis of said cable.

16. The method of claim 15, further including the step of configuring said gripping rib to fit in a valley in said corrugated outer conductor.

17. The method of claim 16, further including the step of configuring said stabilizing members to mate with respective portions of two adjacent crests of said outer conductor on respective sides of said valley.

18. The method of claim 15, further including the step of configuring said gripping rib such that it extends slightly more than 180° around said outer conductor once said saw guide is installed on said cable.

19. The method of claim 15, wherein said gripping rib includes two opposing ends defining a linear distance therebetween, said distance being less than the inner diameter of said cable.

20. The method of claim 15, further including the step of forming an outer guide ring that is radially displaced from each said stabilizing member by a groove.

21. The method of claim 15, further including the step of forming said saw guide such that it is symmetrical and reversible.

* * * * *